(12) United States Patent
Haerdtl

(10) Patent No.: US 11,447,133 B2
(45) Date of Patent: Sep. 20, 2022

(54) BRAKE CONTROL SYSTEM FOR MOTOR VEHICLES

(71) Applicant: Bayerische Motoren Werke Aktiengesellschaft, Munich (DE)

(72) Inventor: Sebastian Haerdtl, Oberhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 431 days.

(21) Appl. No.: 16/591,811

(22) Filed: Oct. 3, 2019

(65) Prior Publication Data
US 2020/0031354 A1 Jan. 30, 2020

Related U.S. Application Data

(63) Continuation of application No. PCT/EP2018/058746, filed on Apr. 5, 2018.

(30) Foreign Application Priority Data

Apr. 6, 2017 (DE) ...................... 10 2017 205 892.7

(51) Int. Cl.
*B60W 30/18* (2012.01)
*B60T 13/66* (2006.01)
(Continued)

(52) U.S. Cl.
CPC ..... *B60W 30/18118* (2013.01); *B60T 13/662* (2013.01); *F16H 59/54* (2013.01); *B60W 2040/1307* (2013.01)

(58) Field of Classification Search
CPC .................. B60T 13/662; F16H 59/54; B60W 30/18118; B60W 2040/1307
See application file for complete search history.

(56) References Cited

U.S. PATENT DOCUMENTS

2007/0078593 A1 4/2007 Fiedler et al.
2007/0179735 A1 8/2007 Fiedler et al.
(Continued)

FOREIGN PATENT DOCUMENTS

CN 1890140 A 1/2007
CN 1894126 A 1/2007
(Continued)

OTHER PUBLICATIONS

Translation of German Patent No. DE 102005060023 obtained from website: https://worldwide.espacenet.com/ on Jan. 31, 22.*
(Continued)

*Primary Examiner* — Pamela Rodriguez
(74) *Attorney, Agent, or Firm* — Crowell & Moring LLP

(57) ABSTRACT

A brake control system has an electronic control unit such that, when the motor vehicle is at a standstill, an automatic parking brake function can be activated by the control unit. In the presence of an activation condition for the parking brake function, the brake pressure required for this purpose can be determined at least in a manner dependent on the longitudinal inclination and in a manner dependent on an estimated normal force distribution of all of the wheels and/or an estimated capability of all of the wheels to transmit braking and/or drive torque to the underlying surface. Here, the brake pressure can be predefined to be higher the more wheels have a reduced normal force.

6 Claims, 2 Drawing Sheets

(51) Int. Cl.
*F16H 59/54* (2006.01)
*B60W 40/13* (2012.01)

(56) References Cited

U.S. PATENT DOCUMENTS

| | | | |
|---|---|---|---|
| 2008/0195289 A1 | 8/2008 | Sokoll | |
| 2010/0004095 A1 | 1/2010 | Sokoll | |
| 2014/0012477 A1* | 1/2014 | Lu | B60W 10/184 701/33.9 |
| 2015/0246662 A1 | 9/2015 | Masuda et al. | |
| 2016/0332627 A1* | 11/2016 | Yoon | B60W 30/18118 |
| 2016/0355164 A1 | 12/2016 | Gottlieb et al. | |
| 2017/0327119 A1* | 11/2017 | Haerdtl | B60W 30/18118 |

FOREIGN PATENT DOCUMENTS

| | | |
|---|---|---|
| CN | 104703849 A | 6/2015 |
| CN | 106030164 A | 10/2016 |
| DE | 196 03 430 A1 | 8/1997 |
| DE | 10 2004 003 886 A1 | 8/2005 |
| DE | 10 2004 034 067 A1 | 2/2006 |
| DE | 10 2005 060 023 A1 | 6/2007 |
| DE | 10 2006 026 626 A1 | 12/2007 |
| DE | 10 2007 006 700 A1 | 8/2008 |
| DE | 10 2007 015 889 A1 | 10/2008 |
| DE | 10 2015 215 427 A1 | 2/2017 |
| EP | 2 907 709 A1 | 8/2015 |

OTHER PUBLICATIONS

International Search Report (PCT/ISA/210) issued in PCT Application No. PCT/EP2018/058746 dated Jul. 13, 2018 with English translation (five pages).

German-language Written Opinion (PCT/ISA/237) issued in PCT Application No. PCT/EP2018/058746 dated Jul. 13, 2018 (five pages).

German-language Search Report issued in German Application No. 10 2017 205 892.7 dated Jul. 2, 2020 with partial English translation (10 pages).

Chinese-language Office Action issued in Chinese Application No. 201880022006.5 dated Mar. 30, 2021 with English translation (13 pages).

* cited by examiner

BRAKE CONTROL SYSTEM FOR MOTOR VEHICLES

CROSS REFERENCE TO RELATED APPLICATIONS

This application is a continuation of PCT International Application No. PCT/EP2018/058746, filed Apr. 5, 2018, which claims priority under 35 U.S.C. § 119 from German Patent Application No. 10 2017 205 892.7, filed Apr. 6, 2017, the entire disclosures of which are herein expressly incorporated by reference.

BACKGROUND AND SUMMARY OF THE INVENTION

The invention relates to a brake control system for motor vehicles comprising a parking brake function.

Brake control systems are known from various patent documents, thus, e.g., from DE 10 2006 026 626 A1, DE 10 2004 034 067 A1, DE 10 2007 006 700 A1, which are to serve to prevent vehicles from rolling away—in particular, but not necessarily, on inclinations. Brake force is thereby mostly held or actively built up on at least one wheel of a vehicle, dependent on or independent of the level of pedal actuation or of another actuating element, in at least one operating state when the brake pedal is actuated or by means of another actuating element. Different occurrence and/or trigger conditions are thereby provided jointly or alternatively for the activation or deactivation, respectively, of the function. The above-mentioned patent documents deal in particular with the improvement of the transition from a parking brake function into a start-up process.

Such brake control systems are known, for example, under the names start-up assistant, hill assistant, hill hold(er) or automatic hold. In the following, these methods will collectively be identified as automatic parking brake functions. All of these automatic parking brake functions have in common, for example, a hydraulic, mechanical, electrohydraulic, electromechanical or pneumatic, electronically controllable brake system, by which it can be accomplished that the vehicle can be held and can be prevented from starting to roll in an unwanted fashion. Methods are also known, in which the vehicle is prevented from starting to roll via the transmission (in particular automatic transmission). With all of these functions, an activation of the function is performed, for example by actuation of the brake pedal or of the hand brake or via control elements communicating therewith or also other actuating elements, respectively (e.g. switches, push buttons, or the like); a deactivation takes place via the same or also other aids (such as, e.g. accelerator pedal position, clutch signal, drive torque signals of the engine or the like, or also upon expiration of a defined stop time).

For the most part, important further required aids, control signals or control means for the representation of the functions are, for example, one or a plurality of speed signals for the detection of the vehicle standstill, mechanical, pneumatic or hydraulic actuators (in principle, electro-hydraulic, electro-pneumatic or electric actuators are likewise contemplated) in the wheel brakes or in the supply lines to the wheel brakes, respectively, via which brake effect can be established and terminated or can be held at least temporarily, respectively (e.g. control/regulating valves integrated in the form of an available control or regulating device, for example ABS, ASC/ASR, DSC/ESP/EHB systems), optionally also longitudinal acceleration or inclination sensors, by which the longitudinal road inclination can be identified and the required brake force for secure standstill of the vehicle and then the start-up torque required for the road inclination can be determined therefrom, and one or a plurality of pressure sensors, respectively, with the help of which the brake pressure or the applied braking torque at the wheel brake or brakes, respectively, can be identified.

It is the object of the invention to also improve an automatic parking brake function for off-road uses.

The brake control system according to the invention has in particular an electronic control unit configured such that an automatic parking brake function can be activated by it in the standstill of the motor vehicle, wherein, if an activation condition for the parking brake function is present, the brake pressure required for this purpose can be determined at least dependent on the longitudinal inclination and dependent on an estimated contact force distribution of all wheels and/or on an estimated capability of all wheels to transmit braking/ or drive torque, respectively, to the underlying surface ("torque transmission capability"). All statements with regard to the contact force distribution hereinafter also apply for the torque transmission capability and further equivalent variables.

The brake pressure can thereby preferably be predetermined to be higher, the more the wheels have a reduced contact force. However, a single defined increased brake pressure can in principle also be capable of being predetermined for all wheels, when at least one wheel has a contact force, which is smaller than a defined threshold value.

It can preferably be detected by the control unit, which wheel has a contact force below a lower limit value, according to which a distribution of the required brake force (total brake force) only to the wheels can be predetermined with a contact force above this limit value.

In a further development of the invention, the contact force (synonymous with a variable, which is proportional to the contact force) of the individual wheels on the basis of the wheel suspension height of the individual wheels, of the slip of the individual wheels, and/or of the transverse inclination of the vehicle, can be identified by way of a corresponding design of the control unit.

The control unit can furthermore be designed in such a way that the friction coefficient of the road surface can be identified on location of the motor vehicle, which is held in standstill by the parking brake function, at least for the driven wheels (e.g. all of them in the case of an all-wheel drive), and the brake pressure can also be determined dependent on the friction coefficient below the individual at least driven wheels. This further development is advantageous in particular in the case of all-wheel drive in off-road operation and in the case of comparatively slow drive speed, which is inevitably associated therewith. This is because a standstill occurs almost at the same location as a preceding very slow drive. The friction coefficient-dependency is preferably only considered when the friction coefficient of a wheel with comparatively high contact force is comparatively low. In other words, the friction coefficient for example in the case of a wheel with a contact force below the defined lower limit value is not relevant and thus does not need to be considered in the case of this wheel.

The invention is based on the following further considerations.

The invention assumes known parking brake functions or start-up assistants, respectively, without adaptation for off-road situations.

For SUVs, the existing prior art can lead to limitations in the support by the start-up assistant during start-up in off-road situations. The start-up assistant calculates a present inclination on the basis of the measured longitudinal acceleration (sensor) and, from this the necessary holding torque of the brake and the necessary start-up torque of the engine.

If the holding torque of the brake in the activated parking brake function prior to the restart is too low, the vehicle rolls backwards when releasing the brake. In particular in difficult off-road situations, however, a reliable holding and sensitive start-up is important. In particular in situations with articulation (only two instead of four wheels transmit the majority of the weight and drive or brake force, respectively), the relation between determined inclination and brake or engine torque, respectively, is not in line, however, because the force (torques), which can be transmitted, are only half as large.

According to the invention, the brake pressure is thus adapted to this situation when reduced contact force is detected at individual wheels and, in particular, in the case of articulation (increased slip of the diagonally opposite wheels shortly prior to standstill): the necessary braking torque for holding the vehicle is increased. An increased necessary engine torque for a restart is then also a result.

In off-road situations, the vehicle is also safely held by the start-up assistant (can also be expanded to functions, such as auto hold, etc.) during the activated parking brake function and does not roll backwards in an uncontrolled manner by the invention. In response to the restarting, the driver can concentrate on the difficult situation and can set the vehicle in motion again in a well-regulated manner without two-foot actuation (one foot actuates the brake, the other foot actuates the accelerator pedal). In particular in the case of SUVs with classically limited articulation capability (i.e. all wheels can no longer touch the ground already in response to small articulations), the described situation is reached relatively quickly when driving even just slightly away from paved roads.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
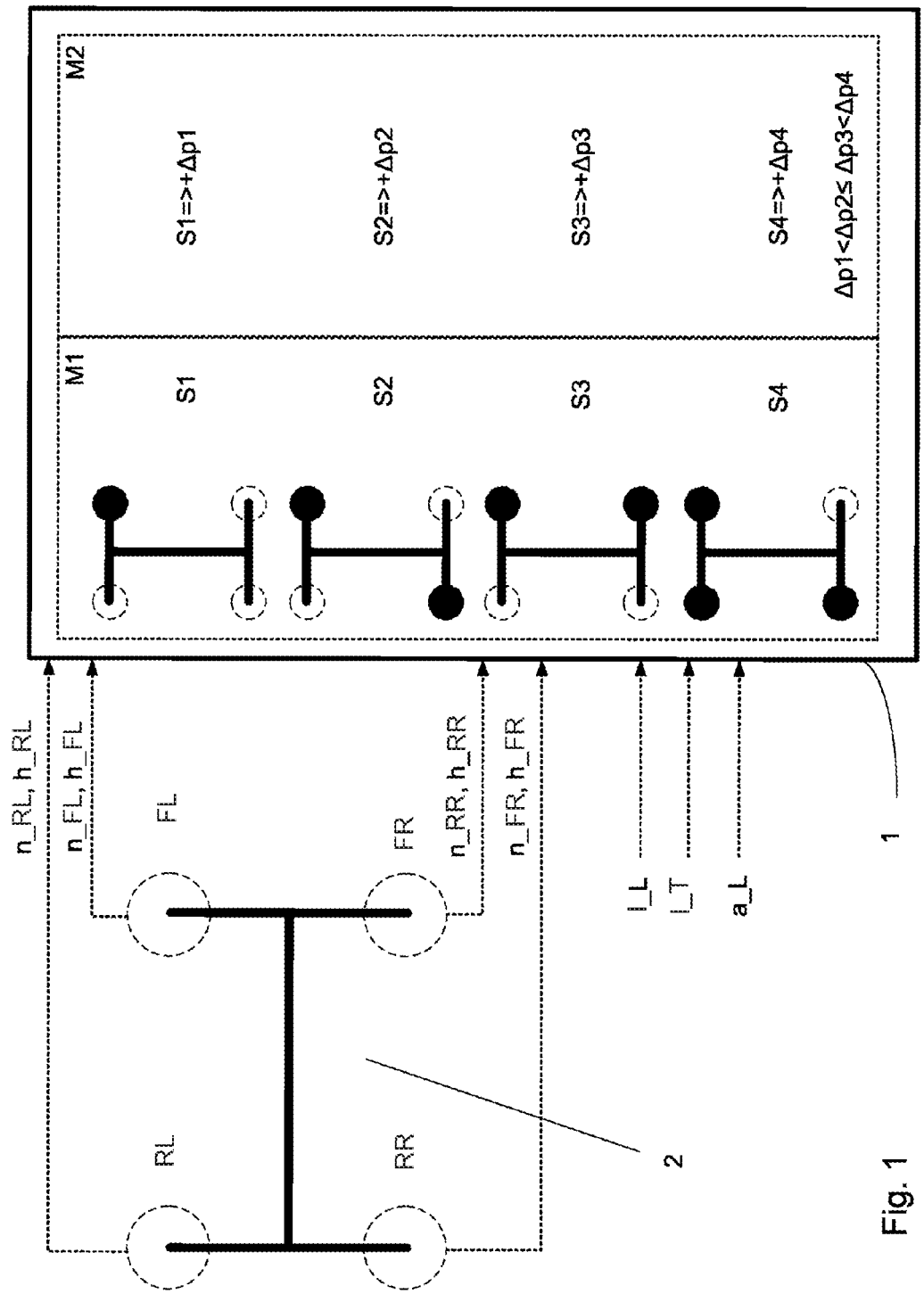
FIG. 1 is a schematic illustration of the most important components of the brake control system according to an embodiment of the invention.

A brake control system for a preferably all-wheel drive motor vehicle 2 comprising an electronic control unit 1, which can be integrated, for example, into a brake control unit, which is already present, is illustrated schematically in FIG. 1.

The control unit 1 can capture, for example, the following input signals:
The speed of the wheel on the front right $n\_FR$
The speed of the wheel on the front left $n\_FL$
The speed of the wheel on the rear right $n\_RR$
The speed of the wheel on the rear left $n\_RL$
The wheel suspension height of the wheel on the front right $h\_FR$
The wheel suspension height of the wheel on the front left $h\_FL$
The wheel suspension height of the wheel on the rear right $h\_RR$
The wheel suspension height of the wheel on the rear left $h\_RL$
The longitudinal vehicle inclination $I\_L$
The transverse vehicle inclination $I\_T$
The longitudinal acceleration $a\_L$ By evaluating these input signals, at least the relative contact forces on the individual wheels can be estimated (see FIG. 2):
$A\_FR$
$A\_FL$
$A\_RR$
$A\_RL$ The control unit 1 is designed in particular by way of a corresponding input signal evaluation and by way of corresponding program modules, e.g. a situation detection module M1 and a brake pressure determination module M2, such that an automatic parking brake function with the following functional elements is activated in the standstill of the motor vehicle:

if an activation condition is present for the parking brake function, the total brake pressure required for this is determined at least dependent on the longitudinal inclination $I\_L$ and dependent on the estimated contact forces of all wheels, the more wheels have a reduced contact force A, the higher the brake pressure p is predetermined.

The invention is only used when at least the longitudinal inclination $I\_L$ is greater than a predetermined threshold value.

The following situations in connection with the contact force distribution can be detected in the exemplary embodiment according to FIG. 1:

S1: The contact force A is distributed to three wheels, one wheel hangs in the air, for example.

S2: The contact force A is distributed to two wheels on the same longitudinal side (e.g. μ-split situation).

S3: The contact force A is distributed diagonally to two wheels.

S4: The contact force A acts essentially only on one wheel, e.g. diagonally to the slope in the case of standstill.

Further situations can be identifiable.

According to the invention, a total brake force required for the parking brake function is assigned to each of these situations. The total brake force can be determined by adding a base brake force P with an offset value $+\Delta P$. In the illustrated exemplary embodiment, the offset values $+\Delta P1$ to $+\Delta P4$ are assigned to the situations S1 to S4, wherein $\Delta P1 < \Delta P2 < \Delta P3 < \Delta P4$ applies.

Figure 2:
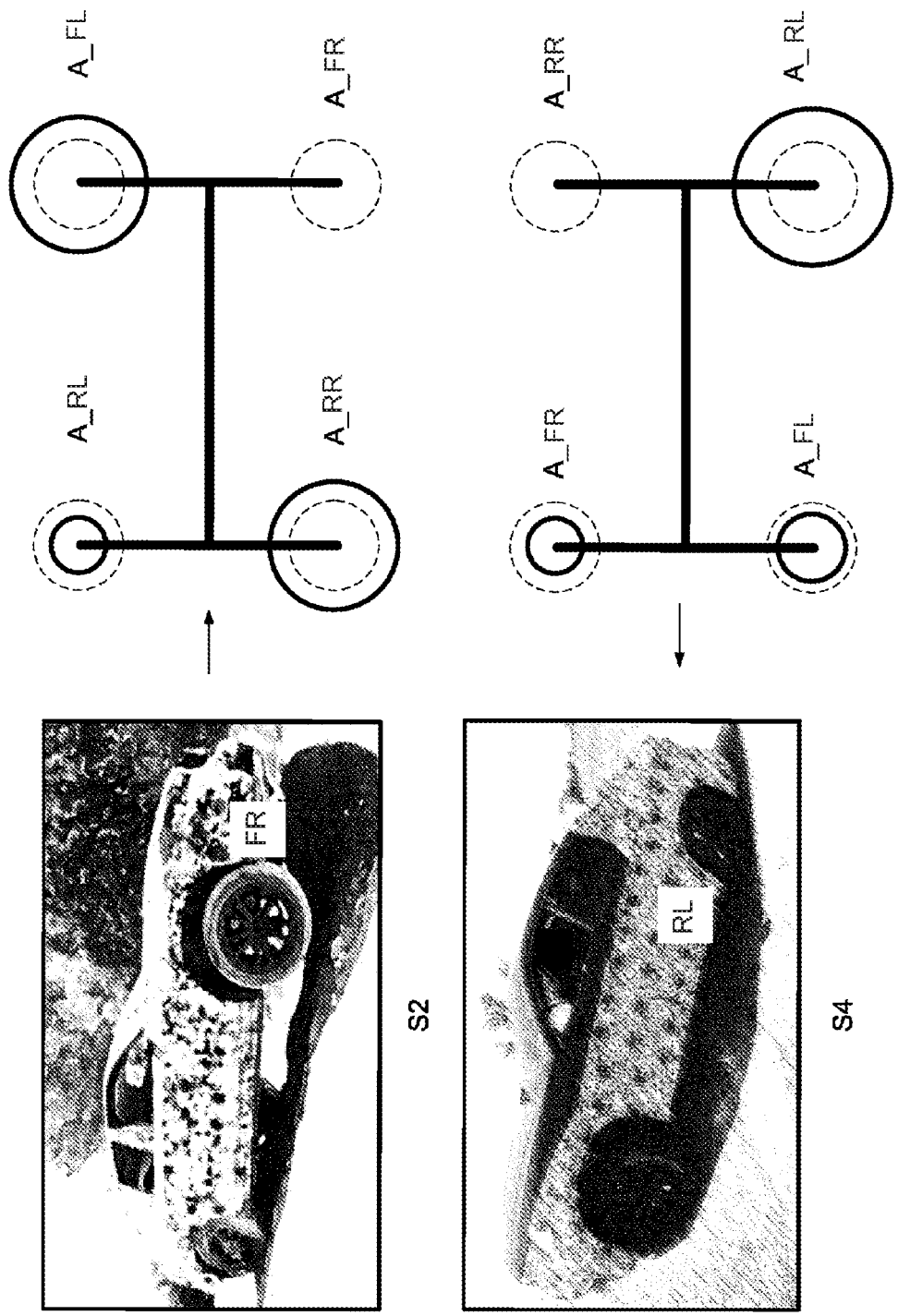
FIG. 2 shows two operating situations, for which the brake control system according to the invention can be used in a particularly advantageous manner.

An off-road situation according to S2 is illustrated in FIG. 2, top, and an off-road situation S4 in reality is illustrated in FIG. 2, bottom. In addition to the respective situations S1 and S4, the respective possible estimated contact forces or the contact force distribution, respectively, are shown. The contact force in the plane, e.g., would be dashed, if the brake force were capable of being distributed evenly to all wheels or a lower limit value. The solid circles each show the contact force distributions for S1 and S4 schematically.

In situation S2 of FIG. 2, the contact force $C\_FR$ is zero due to the wheel FR, which hangs in the air, and the contact force $C\_RL$ is very small, which could be detected, for example, by the wheel height level $h\_FR$ and $h\_RL$ and/or increased slip FR and RR when driving into the driving situation. The total brake force $P+\Delta P1$ would thus be applied to the remaining three wheels.

In situation S4 of FIG. 2, the contact forces $C\_FR$, $C\_FL$, and $C\_RR$ are too small for a sufficient brake force exertion (e.g. smaller than the normal value illustrated by means of dashes as lower limit value), which could be detected, for example, by the wheel height level h_FR and/or the strong transverse vehicle inclination I_T and/or increased slip at FR, FL and RR when driving into the driving situation. The total brake force P+ΔP4 would thus be applied in particular to the wheel RL.

The brake force increase according to the invention can always be used in a particularly preferred manner, when the vehicle is inclined comparatively strongly longitudinally and/or transversely, and optionally when at least one wheel additionally hangs in the air.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake control system for a motor vehicle, comprising:
an electronic control unit configured such that:
an automatic parking brake function is activatable by the control unit in a standstill of the motor vehicle, wherein
if an activation condition for the parking brake function is present, brake pressure required for this purpose is determinable at least dependent on a longitudinal inclination and dependent on an estimated contact force distribution and/or torque transmission capability of all wheels of the motor vehicle, and wherein
the control unit detects which wheel has a contact force and/or torque transmission capability below a lower limit value, wherein a distribution of the required brake force is predetermined only to the wheels with a contact force and/or torque transmission capability above said lower limit value.

2. The brake control system according to claim 1, wherein the brake pressure is predetermined to be higher, the more wheels have a reduced contact force and/or torque transmission capability.

3. The brake control system according to claim 1, wherein the contact force and/or torque transmission capability of the individual wheels is identified by the control unit on the basis of the wheel suspension height of the individual wheels, a slip of the individual wheels, and/or a transverse inclination of the vehicle.

4. The brake control system according to claim 1, wherein the control unit is further configured such that:
a friction coefficient of the road surface is identifiable based on a location of the motor vehicle when the motor vehicle is held in standstill by the parking brake function, at least for the driven wheels, and
the brake pressure is also determinable dependent on the friction coefficient of the road below at least one of the driven wheels.

5. A use of the brake control system according to claim 1, in a case of an all-wheel drive motor vehicle.

6. The use of the brake control system according to claim 5, in a case of a defined off-road operation of the motor vehicle.

\* \* \* \* \*